United States Patent [19]
Wicks

[11] 3,781,053
[45] Dec. 25, 1973

[54] FORK

[76] Inventor: Norman L. Wicks, 1731 W. Capitol Ave., West Sacramento, Calif. 95691

[22] Filed: June 18, 1971

[21] Appl. No.: 154,339

[52] U.S. Cl................. 294/55.5, 172/378, 294/49
[51] Int. Cl............................................ A01d 9/02
[58] Field of Search.................. 294/53.5, 49, 50, 294/50.5, 52, 55.5, 61; 37/120; 56/400.01, 400.11, 400.12, 400.16, 400.21; 172/378; 306/45

[56] References Cited
UNITED STATES PATENTS

| | | | |
|---|---|---|---|
| 1,430,369 | 9/1922 | Funk | 294/55.5 |
| 500,207 | 6/1893 | Hull | 294/55.5 |
| 368,503 | 8/1887 | Alexander | 294/55.5 |
| 1,162,055 | 11/1915 | Harris | 56/400.01 |
| 2,852,996 | 9/1958 | Meyer | 172/378 |
| 2,517,874 | 8/1950 | Hatch | 56/400.01 |
| 227,951 | 5/1880 | Belknap | 56/400.16 X |
| 289,567 | 12/1883 | Schaeffer | 56/400.11 |

FOREIGN PATENTS OR APPLICATIONS

| | | | |
|---|---|---|---|
| 755,305 | 11/1933 | France | 294/55.5 |
| 302,112 | 12/1928 | Great Britain | 294/55.5 |

*Primary Examiner*—Evon C. Blunk
*Assistant Examiner*—Johnny D. Cherry
*Attorney*—Harvey B. Jacobson

[57] ABSTRACT

A sturdy earth working fork-type tool characterized by heavy-duty identical digging and uprooting tines. Each inverted L-shaped tine comprises a downwardly tapering flat-faced pointed blade. The upper rearwardly angled head portions of the tines are apertured, bridge across and are operatively mounted on spaced parallel assembling and linking rods. The lower end of a tubular but reinforced handle is joined to the forward rod and diverging braces carried thereby are secured to the rearward rod.

3 Claims, 4 Drawing Figures

PATENTED DEC 25 1973 3,781,053

Norman L. Hicks
INVENTOR

FORK

This invention relates generally to a fork and it is particularly concerned with a novel handle and fulcrum for such tools, with sufficient strength to virtually eliminate the possibility of bending the handle or tines.

It is also the object of my invention to provide a tool that is advantageous in the digging and removal of heavy sod, the transplanting or removal of trees, shrubs, the harvesting of root crops and the removal of any material whatsoever normally handled with a fork, or shovel from the ground or from piles or stacks. The fork has at least two symmetrical parallel sharpened outer tines and may be constructed with or without two or more parallel sharpened auxiliary inner tines which are symmetrical in shape and are parallel to the outer tines. The rear top portion of the outer tines are protruded and extended to the rear to form a fulcrum. All of said tines are arranged in outwardly diverging relationship to each other and each of said tines tapers gradually on a curve from its shank portion to its free end to provide a point.

The fork also has two parallel inclined braces, tubular spacers and a tubular metal handle reinforced by a flat metal strip inserted upwardly therein from the lower part thereof, said handle, inclined braces, tubular spacers and metal strip being provided with spaced, corresponding openings. The fork is also provided with two rods or bolts passing transversely through the aforesaid opening provided in inclined braces, tubular spacers, metal strip and handle.

It is the further object of my invention to provide a tool that is advantageous in close quarters as said fork can be manufacutred in various widths or provided with extra parts so that the width of said fork can be varied. This feature is especially beneficial when used around trees, shrubs and plants for the removal of grass and weeds in that there is a minimum disturbance or injury to the roots of said trees, shrubs or plants.

A further object of my invention is to provide a tool which may be manufactured with all of the tines identical in shape as shown in FIG. 4 assembled with bolts or threaded rods which can be shipped knocked down.

A still further object of my invention is to provide a tool which may be manufactured with identical inverted L-shaped tines which may be assembled with bolts or threaded rods, the tines of which can be easily removed for sharpening.

Figure 1:
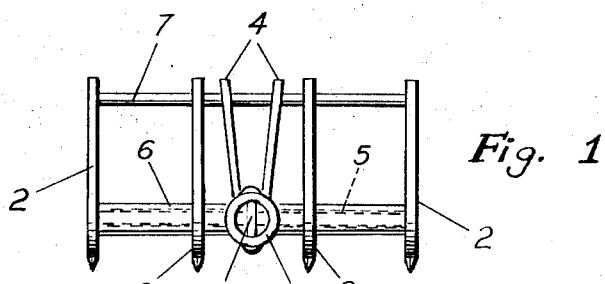
FIG. 1 is an end view of the spading fork, looking in the direction indicated at 1 — 1 of FIG. 2.
Figure 2:
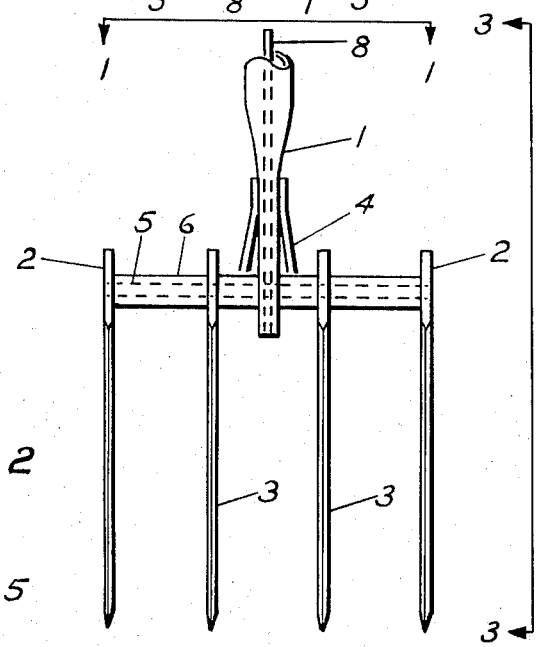
FIG. 2 is a plan view of the spading fork embodying my invention.
Figure 3:
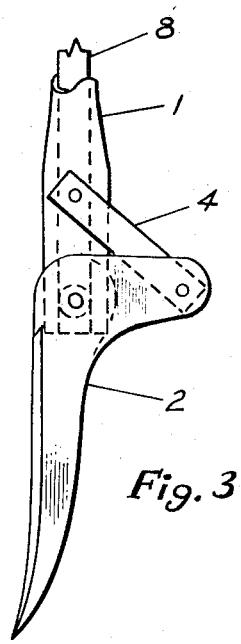
FIG. 3 is a view in side elevation of the spading fork looking in the direction indicated at 3 — 3 of FIG. 2.

Referring to FIGS. 1, 2, and 3, my improved fork has at least two sharpened parallel outer primary tines 2 which are inverted L-shaped, the rear top or head portions projecting rearwardly, as shown in FIG. 3. The fork may or may not also have two or more sharpened in-between parallel auxiliary tines 3 which are symmetrical in shape one to the others and to tines 2. All of said tines 2 and 3 are disposed in outwardly diverging relationship to each other and each of said tines tapering gradually on a curve from its shank portion to its free end to provide a pointed end.

Rod 7 and metal braces 4 provide an additional protuberance from the rear of the fork. Said protuberance provides a fulcrum when the tines are urged into sod, earth, rock or other material normally handled with a spade, shovel, fork or other earth working tools. This protuberance whether fully exposed or partially impaled tears said material lose and out from its original position when downward pressure is applied to handle 1. It shall be noted that when pressure is applied by a workman with his foot, the fork is more easily impaled in hard material than conventional spades, forks, shovels or other earth working tools because of the sharp point and side width of tines 2 and 3, this being especially true when handle 1 is moved by the workman at the same time with forward, rearward and sideway motions. Said motions have a compacting effect on the material immediate to the material to be removed allowing for a more easy entry of the tines to their full length. Further as tines 2 and 3 are narrower on their forward edge than conventional earth working tools, less damage is done to the material worked, this particularly applies in the removal of trees, shrubs, and root crops.

Handle 1 is constructed of metal tubing flattened at its lower end and provided with spaced openings transversely through that portion lying substantially within 5 — 5 and is reinforced by a flat metal strip 8, provided with corresponding spaced openings transversely through said strip. Said strip 8 is inserted in handle 1 and extends up and beyond said spaced openings into said handle, handle 1 is additionally reinforced by two flat symmetrical, parallel inclined braces 4 lying substantially within 5 — 5 provided with spaced openings corresponding with spaced openings in said handle, and flat metal strip 8. Braces 4 are secured at their front ends to the upper opening in handle 1, the upper spaced opening in flat metal strip 8 by a bolt or rod 5 passing transversely through the upper openings of said braces, the upper openings on handle 1, the upper opening in flat metal strip 8 and at the rear end by bolt or rod 7 passing transversely through the lower spaced openings in said braces.

Tines 2 and 3, handle 1, inclined braces 4 and flat metal strip 8 are joined together by rods 5 and 7 passing transversely through tubular spacers 6 and spaced apart openings provided. Handle 1, the outer tines 2, the inner tines 3, inclined braces 4 are held separate one from the other by tubular spacers 6, all secured by welding or other suitable fashion.

Figure 4:
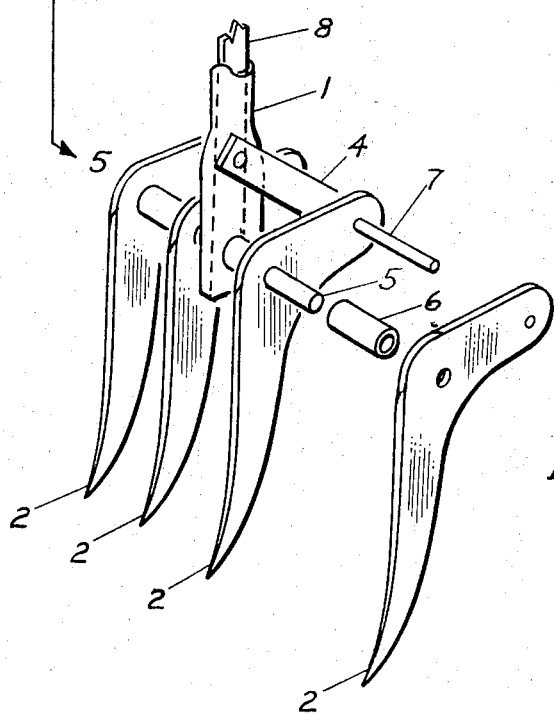
FIG. 4 is a perspective, partially exploded view showing a modified form of fork in which all tines are identical in shape.

Referring to FIG. 4 of the drawings, my improved fork has a plurality of sharpened, removable, parallel L-shaped tines 2 which are symmetrical in shape, the top or head portion being enlarged, and extended rearwardly, as shown in said drawing, all of the tines 2 being in outwardly diverging relationship to each other and each of said tines tapering gradually on a curve from its shank portion to its free end to provide a pointed end. Bolt or rod 7 and inclined metal braces 4 broaden protuberance from the rear of the fork, herein before referred to in connection with drawings 1, 2 and 3 in relation to tines 2. Said protuberance provides a means for exerting additional pressure when handle 1 is moved in a backward and downward motion whether said protuberance is fully exposed or fully or partially impaled when tines 2 are urged into sod, earth, rock or other material normally handled with a spade, shovel, fork or other tool. This protuberance when acted on by the use of handle 1 tears material worked free and out of its original position. The top front portion of tines 2, handle 1, inclined braces 4, flat metal strip 8 are joined together by bolts or rods provided with nuts and washers, received within corresponding spaced openings.

I claim:

1. A manually usable earth working tool, a heavy duty digging and uprooting fork for example, comprising: a rigid elongated forward tine supporting and mounting rod, a corresponding elongated rigid rearward tine assembling and rigidifying rod complemental to said forward rod, said rods being cooperatively associated in a common plane, corresponding in length, being spaced apart a prescribed distance and parallel with each other, a pair of outer primary tines, said tines being rigid, inverted L-shaped in side elevation, and each tine embodying an elongated downwardly tapering pointed blade, said blade having an upper integral rearwardly directed enlarged end providing a tine mounting head the respective heads of said tines bridging the space between and having apertured portions receiving and mounted and retained on oriented end portions of and interconnecting said rods, spacing and retaining sleeves mounted on coacting portions of said forward rod and occupying positions between the respectively associated heads, an upstanding handle, the longitudinal axis of said handle being in handling and fulcruming alignment with the lengthwise axes of said blades and having a lower end fixedly secured to a median portion of said forward rod, and rearwardly directed handle stabilizing braces having forward ends joined by fastening means to an associatively cooperable lower end of said handle and rearwardly diverging ends fastened to a median portion of said rearward rod, each blade having a forward longitudinally curved leading edge which is sharpened and provides a lengthwise cutting and cleaving edge, said heads having rearward terminal end portions projecting beyond said rearward tine assembling and rigidifying rod and convexly rounded and being blunt for safe foot accommodation usage.

2. The earth working tool defined in and according to claim 1, and, in combination, a pair of auxiliary inverted L-shaped tines like said outer tines and likewise constructed and having heads mounted in spaced apart parallel relationship on predetermined median portions of said forward and rearward rods, respectively, all of said tines being aligned and functioning conjointly.

3. The earth working tool defined in and according to claim 2, and wherein said handle is hollow, said lower end being flattened and having aligned holes through which said median portion of said forward rod is passed in a manner to anchor said lower end on said rod, and a handle reinforcing strip member commensurate in length with and fitted lengthwise into the hollow portion of said handle and having a lower end portion thereof securely anchored in a given functioning position by the fastening means for the aforementioned forward ends of said braces.

* * * * *